United States Patent [19]

Wadaya et al.

[11] Patent Number: 4,972,276

[45] Date of Patent: Nov. 20, 1990

[54] REGENERATION SYSTEM FOR DIGITAL MAGNETIC RECORDING INFORMATION

[75] Inventors: Shinichiro Wadaya; Kunihiro Hashimoto; Hideo Abe, all of Iruma, Japan

[73] Assignee: Ye Data Inc., Tokyo, Japan

[21] Appl. No.: 431,038

[22] Filed: Nov. 3, 1989

Related U.S. Application Data

[60] Division of Ser. No. 318,429, Feb. 27, 1989, which is a continuation of Ser. No. 29,981, Mar. 25, 1987, abandoned.

[30] Foreign Application Priority Data

| Apr. 4, 1986 [JP] | Japan | 61-76699 |
| Aug. 25, 1986 [JP] | Japan | 61-197029 |
| Sep. 11, 1986 [JP] | Japan | 61-212790 |

[51] Int. Cl.$^5$ .......................... G11B 5/02; G11B 5/09
[52] U.S. Cl. ......................................... 360/66; 360/46
[58] Field of Search .................................. 360/46, 66

[56] References Cited

U.S. PATENT DOCUMENTS

| 3,252,098 | 5/1966 | Schlaepfer | 360/43 |
| 3,846,829 | 11/1974 | Lin | 360/43 |
| 4,323,932 | 4/1982 | Eibner | 360/43 |
| 4,327,383 | 4/1982 | Holt | 360/43 |
| 4,480,276 | 10/1984 | Batey et al. | 360/43 |
| 4,495,529 | 1/1985 | Gustafson | 360/43 |
| 4,564,870 | 1/1986 | Kitamura | 360/43 |

Primary Examiner—Vincent P. Canney
Attorney, Agent, or Firm—Wenderoth, Lind & Ponack

[57] ABSTRACT

An apparatus is provided for reproducing information recorded on a magnetic recording media. The recorded information is detected and amplified by a magnetic head device and a corresponding amplified detection signal is output therefrom. The amplified detection signal is input to a differentiator and to a non-ideal integrator. The outputs of the differentiator and the non-ideal integrator are subtracted from each other and the thus subtracted signal is applied to a zero crossing point detector. Pulses are generated representing the recorded information at each zero crossing point deteted by the zero crossing point detector. Since the non-ideal integrator does not effect integration of DC and low frequency signals, a compensating device is provided for generating a corresponding DC and low frequency signal and for adding this signal to the output signal of the non-ideal integrator.

7 Claims, 7 Drawing Sheets (a) WRITE DATA (b) WRITE CURRENT (c) HEAD SIGNAL WAVEFORM (a) WRITE DATA (b) WAVEFORM OF HEAD SIGNAL (c) INPUT WAVEFORM D OF DETECTOR 5

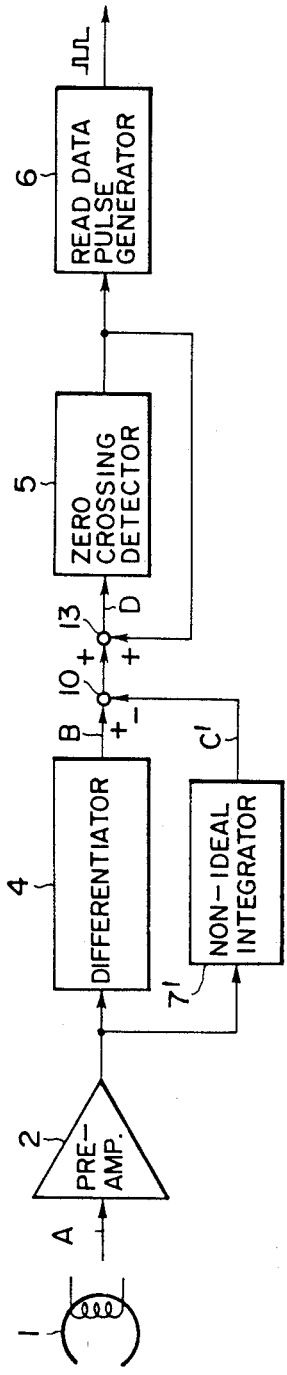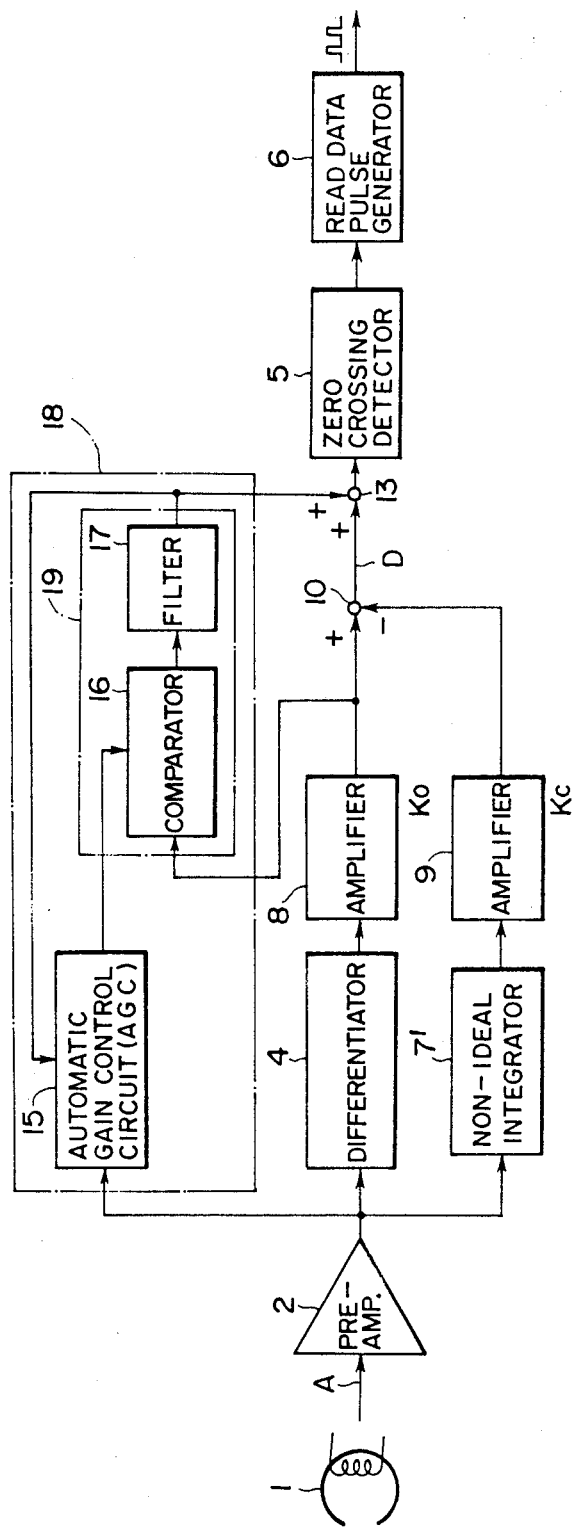
FIG. 8
FIG. 9

4,972,276

REGENERATION SYSTEM FOR DIGITAL MAGNETIC RECORDING INFORMATION

This is a Divisional Application of prior application Ser. No. 07/318,429, filed Feb. 27, 1989, which is a Continuation Application of Ser. No. 029,981, filed Mar. 25, 1987 and now abandoned.

BACKGROUND OF THE INVENTION AND PRIOR ART

The present invention relates to a system for reproducing digital magnetic recording information recorded on a magnetic recording tape, a magentic recording disk or the magnetic media.

In a conventional digital magnetic recording and reproducing apparatus using an induction type magnetic head, for example, a floppy disk drive (hereinafter referred to as an FDD), the demodulation of written digital information of a detection signal A outputted by a magnetic head 1 as shown in FIG. 1 is effected by amplifying the head detection signal A using a pre-amplifier, eliminating the unnecessary high frequency component using of a low-pass filter 3, the filtered signal passing through a differentiator 4 for differentiation thereof, applying the differentiated signal to a zero crossing detector 5 using a comparator, and detecting a peak point of the head detection signal A as a zero crossing point of the differentiated signal. The zero crossing point theoretically coincides with the position of each bit in a row of clock and data patterns in a modulation system which basically employs a NRZI modulation (MFM modulation, FM modulation, 2-7 conversion, and others), whereby write data is thus demodulated from the detection signal. That is, then the detection signal is demodulated through a read data pulse generator 6.

In the above-described digital magnetic recording and reproducing apparatus, the detection signal A from the magnetic head is applied to the differentiator 4 in order to detect the leading edge of the write data, but peak positions $P_1'$ and $P_2'$ of peak values of the input signal waveform W of the differentiator 4 results in a peak shift caused by the resolution of the head and medium and the data and clock pattern.

FIG. 2 illustrates one example. Let $W_1$ be the input signal waveform in the case of only 1P bit of write data, and let $W_2$ be the input signal waveform in the case of only 2P bit of write data. The input signal waveform W to the differentiator 4 is a composite waveform of $W_1$ and $W_2$, and the peak positions $P_1'$ and $P_2'$ thereof are respectively shifted toward the left or right by $\alpha$ or $\beta$ as shown.

This peak shift is varied in its amount and direction according to the write data pattern and recording density. However, if the peak shift is present, the bit spacing of a reproduced signal will be different from the bit spacing of the write data. This reduces the reliability of the digital magnetic recording and reproducing apparatus, and is an impediment to storing the write data written on a floppy disk (hereinafter referred to as an FD) at a high density.

Also, according to the aforementioned conventional method, a depression (which is called a saddle) occurs in the differentiated waveform in the area of low density. Accordingly, a protective circuit has been required prohibit to erroneous detection of the saddle as a data bit by the comparator.

SUMMARY OF THE INVENTION

It is the object of the present invention to provide a system which can obtain a reproduced signal of written digital information free from peak shift of a zero crossing point.

That is, according to the present invention, in the case of a digital magnetic recording and reproducing apparatus having a magnetic induction head for use in both recording and reading, the detection signal of the magnetic head is applied to a differentiator and an integrator, and subsequently, the integrator output signal is subtracted from the differentiator output signal or vice versa. Thereafter the resultant signal is applied to a zero crossing detector, and a digital information signal is generated from the output signal of the zero crossing detector, thereby avoiding the occurrence of a peak shift.

In addition, in the case of a digital magnetic recording and reproducing apparatus using a magnetic resistive used head exclusively reading, which cannot be used for writing, the detection signal of the magnetic resistive type head is the equivalent of a signal obtained by applying the detection signal of the aforesaid magnetic induction head to an integrator. The detection signal of the magnetic resistive head is applied to differentiators in the form of two stages, and subsequently, the detection signal is subtracted form the twice differentiated signal. Thereafter, the resultant signal is applied to a zero crossing detector, and a digital information signal is generated from the output signal of the zero crossing detector. By employment of which system a peak shift does not occur.

That is, according to the present invention, in either the case of using the magnetic induction head or the case of using the magnetic resistive head, a differential signal and an integrated signal are subjected to subtraction to thereby obtain a zero crossing point without a shift, and subsequently, the signal is transformed into a row of data to thereby obtain a reproduced signal of written digital information at a high precision.

And, according to the present invention, even in the case where a saddle does occur in a differential waveform, a reproduced signal of high precision may be obtained.

In the following, the embodiments of the present invention will be described with reference to the accompanying drawings.

BRIEF DESCRIPTION OF THE DRAWINGS

FIGS. 8 to 11 respectively are block diagrams of modified embodiments of the present invention where a magnetic induction head is used.

DESCRIPTION OF THE PREFERRED EMBODIMENTS

Figure 1:
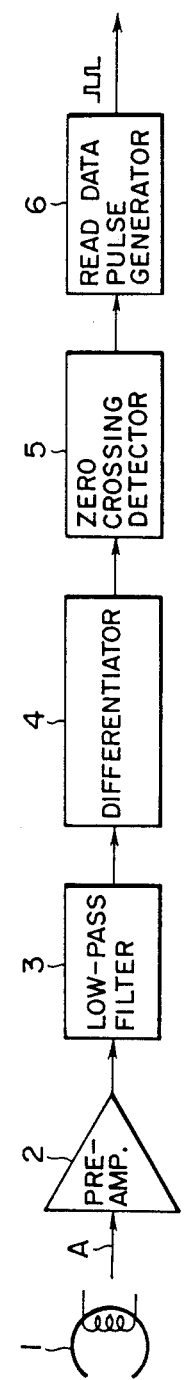
FIG. 1 is a block diagram showing the conventional construction of a digital magnetic reproducing apparatus which uses a magnetic inducing head.
Figure 3:
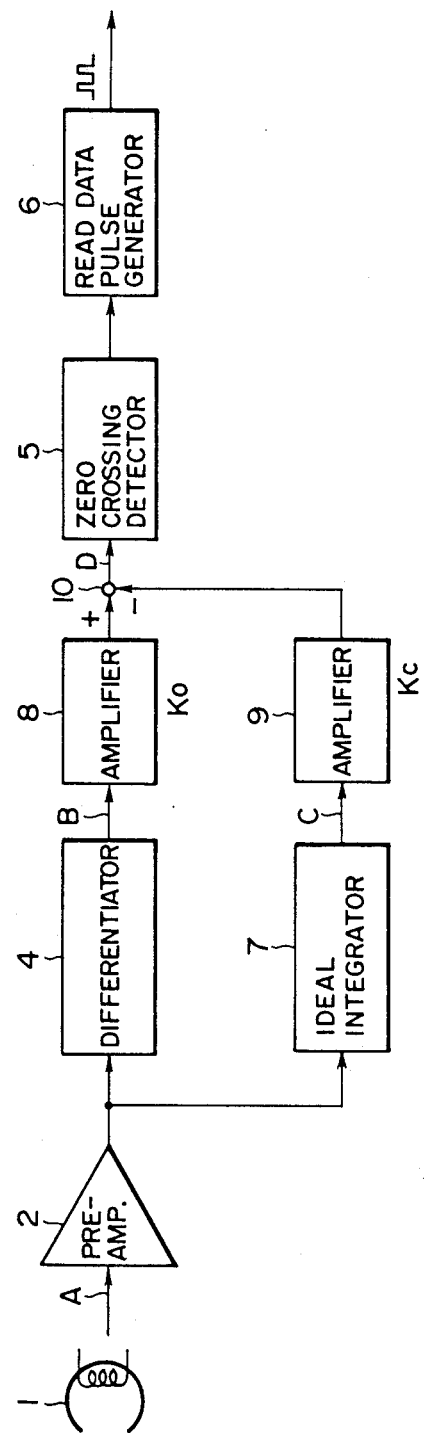
FIG. 3 is a block diagram showing the construction of a digital magnetic reproducing apparatus according to the present invention which uses a magnetic induction head.
Figure 2:
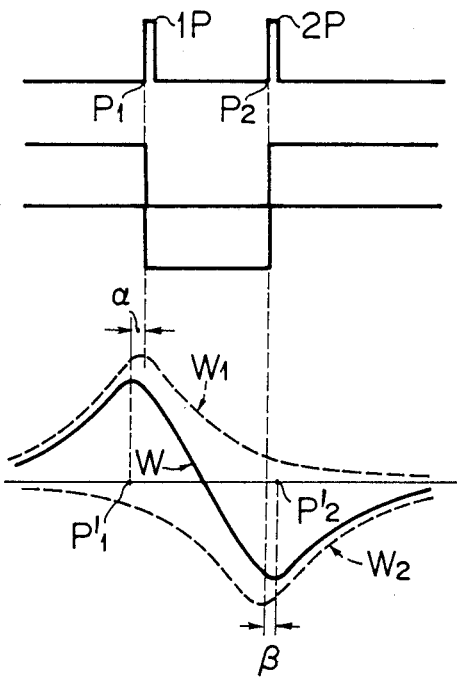
FIG. 2a through c exhibits waveforms for explaining problems encountered in the conventional apparatus shown in FIG. 1.

FIG. 3 shows an embodiment of the present invention where a magnetic induction head is used. In this embodiment, a magnetic head detection signal A having passed through a pre-amplifier 2 is applied to both a differentiator 4 and an integrator 7, and the subsequent output of the integrator 7 is subtracted from the output signal of the differentiator 4. Thereafter, the resultant signal is applied to a zero crossing detector 5 using an 0V comparator, and a digital information signal is generated from the output signal of the zero crossing detector 5. In FIG. 3, reference numeral 6 designates a read data pulse generator and reference numerals 8 and 9 designate amplifiers, respectively. Reference numeral 10 designates a subtractor. While in this embodiment, the output signal C of the intergrator 7 is subtracted from the output signal B of the differentiator 4, is it noted that the output signal B may be subtracted from the output siganl C.

Figure 4:
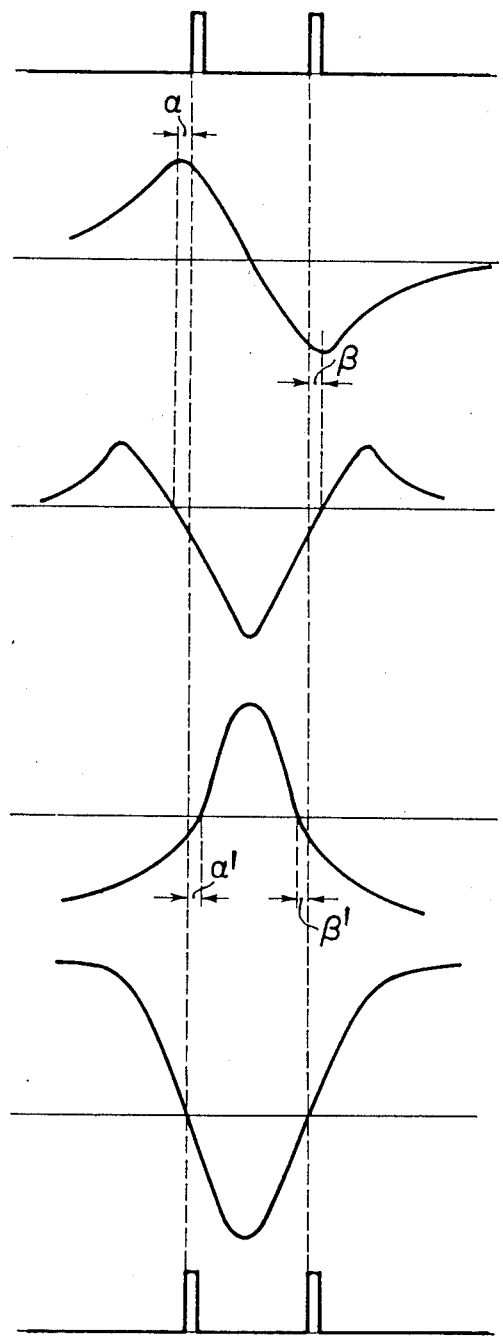
FIG. 4a through f exhibits waveforms showing the principle of the operation of the embodiment shown in FIG. 3.

When such a configuration is employed, the integrated waveform of the head signal is as shown in FIG. 4(d) is opposite in shifting direction to that of the differential waveform of the head signal shown in FIG. 4(c). Therefore, proper positional information without shift may be obtained by carrying out a subtraction, the resultant signal is subsequently formed into a row of data whereby a reproduced signal of written digital information having a high precision may be obtained.

In addition, even in the case where a saddle does occur in the differential waveform, the saddle is eliminated and therefore a reproduced signal having a high precision may be obtained.

Figure 5:
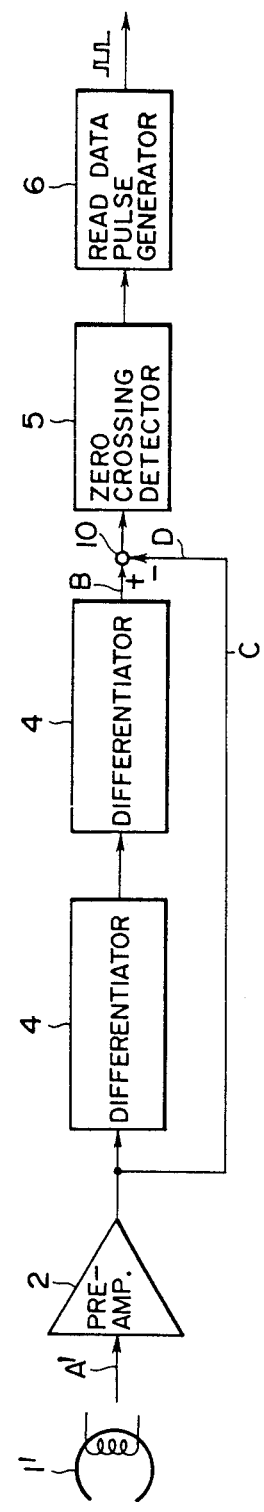
FIG. 5 is a block diagram of one embodiment of the present invention where a magnetic resistive head is used.

FIG. 5 shows an embodiment of the present invention where a magnetic resistive head (MR head) 1′ is used. In this case, since the amplifier output is the same as a signal having passed through the aforementioned intergrator 7, the amplifier output is applied to two stages of differentiators 4, 4, without using the integrator as in the embodiment shown in FIG. 3. Subsequently, the amplifier output signal is subtracted from the twice-differentiated signal, the resultant signal is then applied to the zero crossing detector 5, and a digital information signal is generated from the output signal of the zero crossing detector 5. Also, in this case, the subtraction can be carried out in reverse.

The embodiment shown in FIG. 3 is not practical because the integrator is expensive and drift or the like tends to occur.

This problem may be solved by using a non-ideal intregrator, which is simple in construction and can be obtained at less cost, in place of an integrator.

Figure 6:
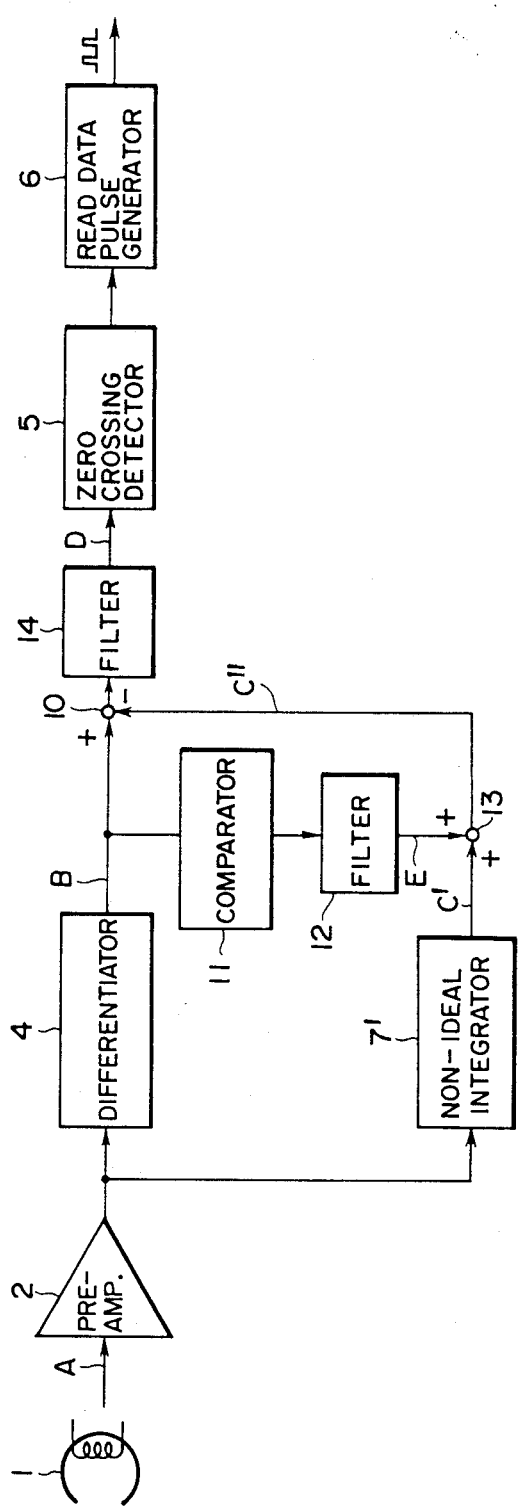
FIG. 6 is a block diagram of a modified embodiment of the present invention where a magnetic induction head is used.

FIG. 6 shows an embodiment of the present invention where a non-ideal integrator is used. In this embodiment, a non-ideal integrator 7′ is used in place of the integrator 7 shown in FIG. 3, and the output signal of the differentiator 4 is applied to a comparator 11 and a filter 12. Also a correction signal E which has generated a direct current and a low frequency signal is added to the output signal of the non-ideal integrator 7′ to create a signal C″, which is then subtracted from the output signal of the differentiator 4 by means of a subtractor 10.

Figure 7:
FIG. 7a through c exhibits waveforms for explaining the effect of the embodiment shown in FIG. 3.
Figure 7:
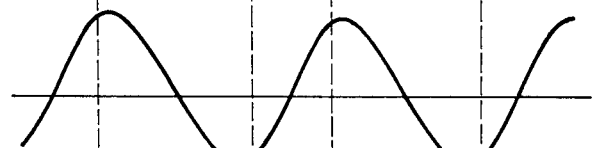
Figure 7:
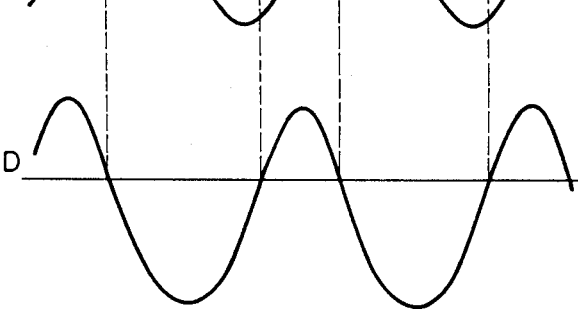

FIG. 7(c) shows the result of simulation where a magnetic head detection waveform (see FIG. 7(b)) of a write data pattern "101101", coded by NRZI, is applied to the reproduction circuit shown in FIG. 3. This is the case in which the recording density is higher than the ability possessed by the head and medium. Accordingly, the peak point of the waveform of the head signal shown in FIG. 7(b) has a peak shift. However as is be apparent from viewing FIG. 7(c), ideal detection, in which the zero crossing point is not shifted, as compared with the write data may be finally obtained.

FIG. 8 depicts a modified embodiment of the present invention, which functions the same as the former embodiment, except that the comparator 11 for restoring a direct current and a low frequency signal and the filter 12 in the embodiment shown in FIG. 6 are not used.

That is, the feedback signal of the zero crossing detector 5 creates a direct current and low frequency signal which is utilized to simplify the construction of the circuit.

FIG. 9 depicts another embodiment of the present invention in which a magnetic head detection signal A having passed through a pre-amplifier 2 is applied to a differentiator 4 and a non-ideal integrator 7′, and subsequently, the non-ideal integrator output signal is subtracted from the differentiator output signal thereof. Thereafter, the resultant signal D is applied to a zero crossing detector 5 using an 0V comparator, a digital information signal is generated from the output signal of the zero crossing detector 5, and the output signal of the DC and low-frequency signal generator is subjected to automatic gain by an automatic gain control circuit (AGC) of which the input signal is a bead detection signal A amplified by a pre-amplifier 2, a comparator 16 and a filter 17 are used to add a signal to the aforementioned resultant signal D.

That is, if the configuration using a non-ideal integrator in place of an integrator is employed, the aforesaid problem is overcome. However, the non-ideal integrator fails to provide information of a DC and low frequency portion as is known, and therefore, as shown in FIG. 9, the DC and low-frequency signal generator subjected to automatic gain control is added to the configuration in order to make up for the DC and low frequency information not provided by the non-ideal integrator.

A comparator 16, having input thereto the output of the amplifier 8, and a filter 17 constitute the DC and low-frequency signal generator 19 which produces the DC component and the low frequency component lost by the use of the non-ideal integrator 7′, wherein and the filter 17 is comprised of an intrinsic filter selected according to the characteristic of the head and medium.

Also, the automatic gain control circuit 15 is used due to the need for proportionality with the amplitude of the aforesaid resultant signal D. The AGC is used to selectively control the amplitude of the input signal from the filter 17 and to send this controlled signal to the comparator 16.

Figure 10:
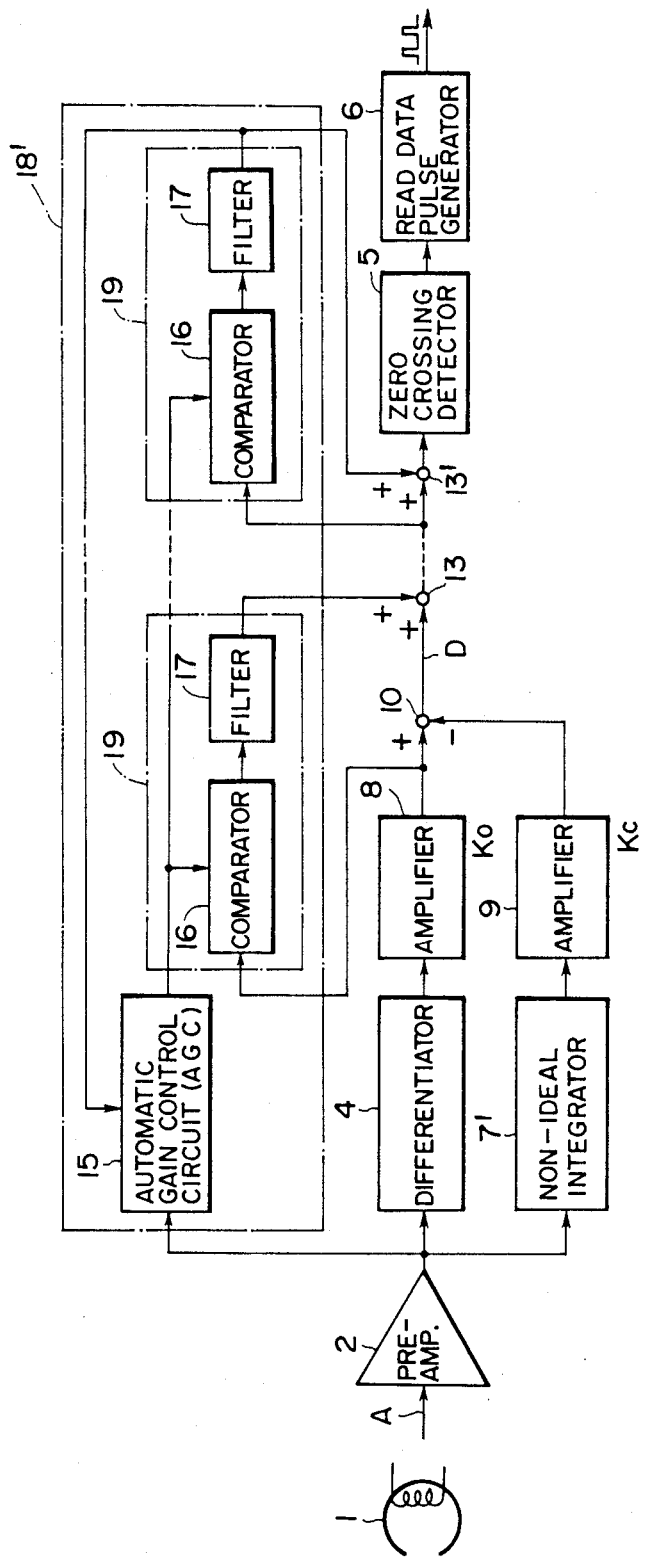

While in the embodiment shown in FIG. 9, only one stage of the DC and low-frequency signal regenerator is employed, it is noted that multi-stages (n stages) thereof may be used. Such a structure is shown in FIG. 10 in which the same parts as those shown in FIG. 9 have the same reference numerals.

When the multi-stage DC and low-frequency signal generator 19 is used as described above, more accurate low-frequency information is obtained in proportion to the number of stages, and a row of data bits having a high precision may be reproduced.

However, this multi-stage syste, is able to reduce the peak shift amount that is acquired with the single stage system, but it cannot reduce it to zero.

For example, in the case where an ideal spacing of an output is 2 μs, suppose that the spacing is 2.3 μs due to the shift. If the number of stages is increased, the spacing will in turn decrease for each additional stage from 2.3 μs, to 2.2 μs, then to 2.1 μs, and then to 2.05 μs. That is, even though the pulse spacing will approach the ideal spacing, it but will never be 2.0 μs.

Moreover, to increase the number of stages as described above poses a problem in realization in view of the costs, the size of circuit and the like.

Thus, the present inventors have conducted further studies the result of which they have achieved a reduction system which can obtain and effect equal to that of the multi-stage configuration, even though the mulitstage configuration is not provided.

That is, the present inventors have perceived that the output pulse spacing of ideal read data is restricted when the modulation system and transfer rate used in the digital magnetic recording apparatus are determined, for example, in the case of MFM modulation of 500 Kbits/sec, the spacing is either 2 μs, 3 μs or 4 μs, and have succeeded in their a design of such that the clock signal of the variable frequency oscillator (VFO) in synchronism with the average frequency of the modulation signal (read data) is used as an input signal of the DC and low-frequency signal generator 19 whereby obtaining a is obtained which is equal to or greater than the case in which the multi-stage DC and low-frequency signal generator is used.

Figure 11:
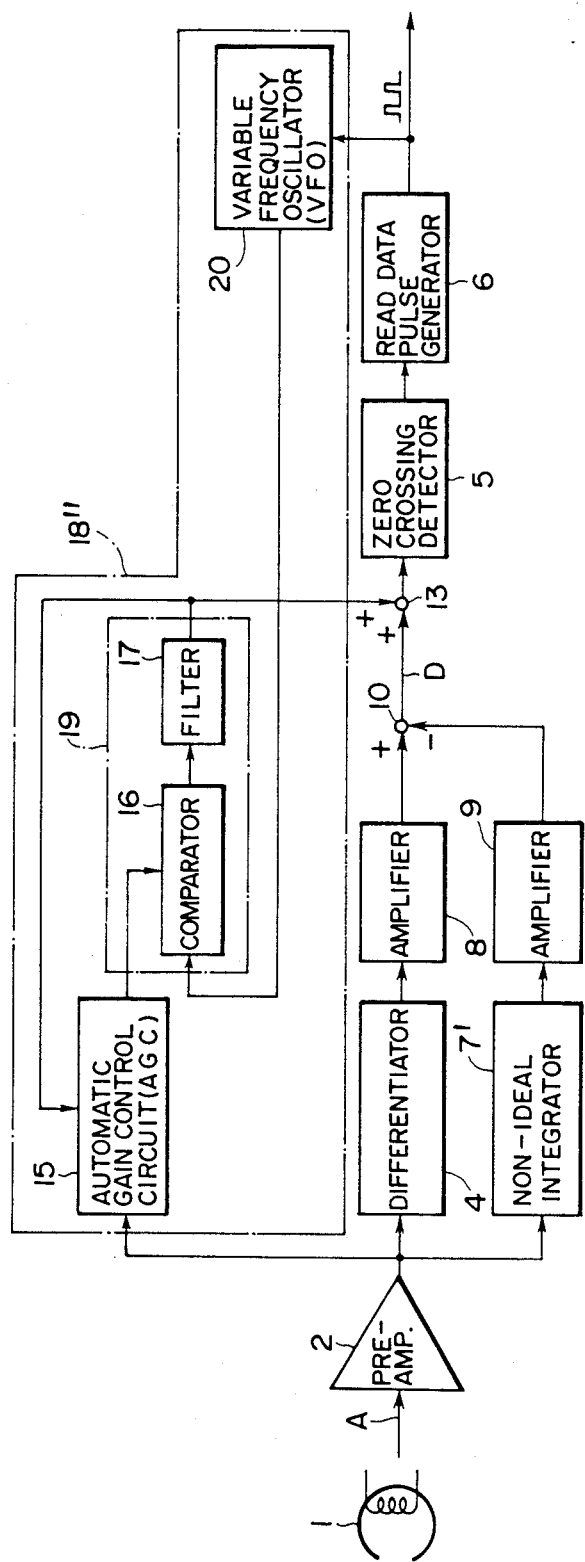

FIG. 11 shows an embodiment as mentioned above, which is different from one shown in FIG. 9 in the following points:

That is, in the embodiment shown in FIG. 9, the input signal of the comparator 16 is obtained by applying a differential signal into the amplifier 8, whereas in the embodiment of FIG. 11, the input signal is obtained by applying a modulation signal (read data) to a variable frequency oscillator 20.

Since in this configuration an output of a DC and low frequency reproducer 19 is applied to an adder circuit 13 to correct low-frequency information for demodulation via the zero crossing detector 5 and read pulse generator 6, and since a demodulated signal having a small peak shift is used as an input signal of the DC and low-frequency signal reproducer 19 via a variable frequency oscillator 20, even if the number of stages of the DC and low-frequency signal generator 19 is one, it is possible to obtain read data having a peak shift equal to or less than that of the multi-stage arrangement.

Moreover, it is advantageous in terms of reduced cost, miniaturization and the like.

While various embodiments have been described, the effects of the present invention may be summarized as follows:

That is, in a conventional detection system for detecting a peak value of digital magnetic recording, the recording density has been limited by the peak shift relying upon the resolution of a head and medium system such as the head gap length, spacing or the like.

According to the design of the present invention, an error in positional information resulting from the peak shift can be eliminated and therefore the recording density may be enhanced.

In addition, since the performance is not affected by the head and medium system, freedom is provided in designing the head and the medium, thus enhancing the reliability of the apparatus.

Moreover, a system using a non-ideal integrator is employed whereby a digital magnetic recording apparatus of high precision may be provided inexpensively.

What is claimed is:

1. An apparatus for reproducing information recorded on a magnetic recording media, said information having been detected and amplified by a magnetic head device and outputted as an amplified detection signal, said apparatus comprising:
    differentiating means, having means for connecting to the magnetic head device, for differentiating the amplified detection signal and for outputting a corresponding differentiated signal;
    a non-ideal integrator, having means for connecting to the magnetic head device, for integrating the amplified detection signal and for outputting a corresponding integrated signal;
    DC and low frequency signal generating means, coupled to said differentiating means, for detecting DC and low frequency signal components of the amplified detection signal according to said differential signal and for outputting a corresponding DC and low frequency signal;
    adding means, coupled to said non-ideal integrator and said DC and low frequency signal generating means, for adding said integrated signal and said DC and low frequency signal and for outputting a corresponding added signal;
    subtracting means, coupled to differentiating means and said adding means, for subtracting one of said differentiated signal and said added signal from the other of said differentiated signal and said added signal and for outputting a corresponding subtracted signal;
    zero crossing detecting means, coupled to said subtracting means, for detecting zero crossing points of said subtracted signal; and,
    pulse generating means, coupled to said zero crossing detecting means, for generating a pulse corresponding to each zero crossing point of said subtracted signal detected by said zero crossing detecting means.

2. An apparatus as recited in claim 1, said DC and low frequency generating means comprising a zero-volt comparator.

3. An apparatus for reproducing information recorded on a magnetic recording media, said information having been detected and amplified by a magnetic head device and outputted as an amplified detection signal, said apparatus comprising:
    differentiating means, having means for connecting to the magnetic head device, for differentiating the amplified detection signal and for outputting a corresponding differentiated signal;
    a non-ideal integrator, having means for connecting to the magnetic head device, for intergrating the amplified detection signal and for outputting a corresponding integrated signal;
    subtracting means, coupled to differentiating means and said non-ideal integrator, for subtracting one of said differentiated signal and said integrated signal from the other of said differentiated signal and said integrated signal and for outputting a corresponding subtracted signal;

adding means, coupled to said subtracting means, for adding said subtracted signal and a zero crossing point signal and for outputting a corresponding added signal;

zero crossing detecting means, coupled to said adding means, for detecting zero crossing points of said added signal and for outputting a said zero crossing point signal; and, pulse generating means, coupled to said zero crossing detecting means, for generating a pulse corresponding to each zero crossing point of said added signal according to said zero crossing point signal.

4. An apparatus for reproducing information recorded on a magnetic recording media, said information having been detected and amplified by a magnetic head device and outputted as an amplified detection signal, said apparatus comprising:

differentiating means, having means for connecting to the magnetic head device, for differentiating the amplified detection signal and for outputting a corresponding differentiated signal;

a non-ideal integrator, having means for connecting to the magnetic head device, for integrating the amplified detection signal and for outputting a corresponding integrated signal;

DC and low frequency signal generating means, having means for connecting to the magnetic head device, for detecting DC and low frequency signal components of the amplified detection signal and for outputting a corresponding DC and low frequency signal;

subtracting means, coupled to differentiating means and said non-ideal integrator, for subtracting one of said differentiated signal and said integrated signal from the other of said differentiated signal and said integrated signal and for outputting a corresponding subtracted signal;

adding means, coupled to said DC and low frequency generating means and said subtracting means, for adding said subtracted signal and said DC and low frequency signal and for outputting a corresponding added signal;

zero crossing detecting means, coupled to said adding means, for detecting zero crossing points of said added signal; and, pulse generating means, coupled to said zero crossing detecting means, for generating a pulse corresponding to each zero crossing point of said added signal detected by said zero crossing detecting means.

5. An apparatus as recited in claim 4, said DC and low frequency signal generating means comprising:

an automatic gain control circuit having first and second inputs and a first output, said first input for receiving the amplified detection signal;

a comparator device having third and fourth inputs and a second output, said third input for receiving said differentiated signal and said fourth input being coupled to said first output of said automatic gain control circuit; and, a filter device having a fifth input and a third output, said fifth input being coupled to said second output of said comparator device, and said third output being coupled to said second input of said automatic gain control circuit and to said adding means.

6. An apparatus as recited in claim 4, said DC and low frequency signal generating means comprising an automatic gain control circuit and N comparator stages, N being a positive integer greater than 1, each of said N comparator stages comprising a comparator circuit and a filter, said apparatus further comprising (N−1) summing means for successively adding outputs of said N comparator stages.

7. An apparatus as recited in claim 4, said DC and low frequency signal generating means comprising:

an automatic gain control circuit having first and second inputs and a first output, said first input for receiving the amplified detection signal;

a comparator device having third and fourth inputs and a second output, said fourth input being coupled to said first output of said automatic gain control circuit; and, a filter device having a fifth input and a third output, said fifth input being coupled to said second output of said comparator device, and said third output being coupled to said second input of said automatic gain control circuit and to said adding means; and, a variable frequency oscillator having a sixth input and a fourth output, said sixth input being coupled to an output of said pulse generating means and said fourth output being coupled to said third input of said comparator device.

* * * * *